(12) United States Patent
McCutchen

(10) Patent No.: US 8,018,489 B2
(45) Date of Patent: Sep. 13, 2011

(54) SURVEILLANCE SYSTEM

(76) Inventor: David McCutchen, Portland, OR (US)

( * ) Notice: Subject to any disclaimer, the term of this patent is extended or adjusted under 35 U.S.C. 154(b) by 1684 days.

(21) Appl. No.: 11/293,408

(22) Filed: Dec. 2, 2005

(65) Prior Publication Data

US 2008/0117294 A1  May 22, 2008

(51) Int. Cl.
*H04N 7/18* (2006.01)
(52) U.S. Cl. .......... 348/143; 348/144; 348/148
(58) Field of Classification Search .......... 348/24, 348/38, 117, 142, 143, 144, 159, 148; 248/551, 248/552, 317, 323, 324, 327, 343, 345; 70/58, 70/62; 382/105; 235/462.43; 396/7
See application file for complete search history.

(56) References Cited

U.S. PATENT DOCUMENTS

| | | | |
|---|---|---|---|
| 4,393,408 A | 7/1983 | Beck et al. | |
| 4,543,603 A * | 9/1985 | Laures | 348/145 |
| 5,121,037 A | 6/1992 | Peterson et al. | |
| 5,127,617 A * | 7/1992 | Bergetz | 248/278.1 |
| 5,418,567 A * | 5/1995 | Boers et al. | 348/375 |
| 5,724,171 A | 3/1998 | Amos et al. | |
| 6,120,379 A | 9/2000 | Tanaka et al. | |
| 6,144,406 A | 11/2000 | Girard et al. | |
| 6,335,758 B1 | 1/2002 | Ochi et al. | |
| 6,633,328 B1 * | 10/2003 | Byrd et al. | 348/143 |
| 6,757,008 B1 | 6/2004 | Smith | |
| 6,831,699 B2 | 12/2004 | Chang et al. | |
| 6,870,488 B1 * | 3/2005 | Compton | 340/933 |
| 6,891,643 B1 | 5/2005 | Matsuda | |
| 2003/0067209 A1 * | 4/2003 | Marrero | 301/5.23 |
| 2003/0174865 A1 * | 9/2003 | Vernon | 382/105 |
| 2003/0185549 A1 * | 10/2003 | Partynski et al. | 396/7 |
| 2003/0234862 A1 * | 12/2003 | Andersen | 348/144 |
| 2004/0069729 A1 * | 4/2004 | Kin et al. | 211/45 |
| 2004/0149829 A1 * | 8/2004 | Boucher et al. | 235/462.43 |
| 2004/0179093 A1 * | 9/2004 | Inan | 348/36 |
| 2004/0183941 A1 | 9/2004 | McCutchen | |
| 2004/0208375 A1 * | 10/2004 | Gupta et al. | 382/217 |
| 2004/0212677 A1 | 10/2004 | Uebbing | |
| 2004/0252200 A1 * | 12/2004 | Thomas | 348/208.4 |
| 2005/0063696 A1 * | 3/2005 | Finizio et al. | 396/427 |
| 2005/0205795 A1 * | 9/2005 | Blevis et al. | 250/370.09 |
| 2006/0284046 A1 * | 12/2006 | Umberg | 248/551 |
| 2007/0104353 A1 * | 5/2007 | Vogel | 382/106 |
| 2007/0121779 A1 * | 5/2007 | Nishide et al. | 378/4 |
| 2010/0050706 A1 * | 3/2010 | O'Neill | 70/58 |

OTHER PUBLICATIONS

Sony ILX585K Line Scan Sensor, Jul. 30, 2002, Sony, 20 pages.
Quad ADSP TS201S TigerSharc PMC Board.cfm.htm, 2005, BittWare, Inc., 3 pages, Dec. 2005.
Tsunami-PCI-4001_DS, 2004, SBS Technologies, 2 pages, Dec. 2004.
Tsunami-CPCI-8001, 2004, SBS Technologies, 2 pages, Dec. 2004.

(Continued)

*Primary Examiner* — Jerome Grant, II
(74) *Attorney, Agent, or Firm* — Marger Johnson & McCollom PC

(57) ABSTRACT

A surveillance device makes use of a fixed point in space such as a stabilized blimp, and a downward-looking high-resolution scanning camera. One or more line scan devices are arranged in a radial fashion on a rotating disk, together with associated lenses, so as to repeatedly scan an area of interest. To allow for manageable data bandwidth and to focus on objects of interest, the data from successive scans is compared so as to show primarily the moving objects, with occasional full-scan reference images included.

22 Claims, 6 Drawing Sheets

OTHER PUBLICATIONS

Dalsa Trillium Color line scan TR-37_00056-05, Sep. 29, 2004, Dalsa, 2 pages.
Fairchild2K_and_4K_Camera_Manual_072104, 2004, Fairchild Imagining, Inc., 38 pages.
CameraLink20v113, Jan. 2004, Automated Imaging Association, 48 pages.
Lumpkin, Air Force test high-altitude balloons, Jul. 5, 2005, Salon.com, 3 pages.

Office Action mailed Sep. 4, 2008 corresponding to U.S. Appl. No. 11/293,409.

* cited by examiner

SURVEILLANCE SYSTEM

FIELD OF THE INVENTION

This invention generally relates to digital imaging systems, and in particular to such a system that employs rotary line scanning and reduction of non-essential image elements to provide a high-resolution surveillance system.

BACKGROUND AND SUMMARY OF THE INVENTION

In chaotic situations it is difficult to know what to photograph. It is easy to miss an essential element. If a crime has been committed, it is even more important to gather crucial evidence. But too often the meaning of images can only be appreciated later. Therefore the best forensic analysis would allow one to see a total picture of the essential elements and also be able to trace the most important ones after the fact. In combating an insurgency in an urban area, for example, it would be desirable to continuously image all of an area over which insurgency events might occur, so as to have the ability to trace back from such an event any movements or actions that led up to it. Conventional imaging systems and technologies are incapable of providing such imagery because they lack the ability to persistently image such large areas and the ability to process the vast amounts of image data that would arise from such imagery. It will be appreciated that this example illustrates only one application of such a capability, which would have much wider applicability.

In some urban settings large numbers of standard closed-circuit television cameras each record a two-dimensional view of a scene. Although some of the recorded scenes might be overlapping or contiguous, the scenes are generally selected strategically to capture only areas of highest activity or risk, leaving gaps between the scenes that are being imaged. The reason is that the numbers of cameras and images that would be required to capture all of an urban core, for example, would be prohibitive. As a consequence, events that occur in the gaps between camera scenes are not recorded. The various camera images are scattered, and not able to be presented as a unified picture. In addition, retrieval of relevant images after an event is generally done manually by an operator or investigator reviewing tapes of the recorded scenes.

Accordingly, the present invention provides a high-resolution surveillance camera system capable of persistently imaging a large-scale surveillance area. In operation, the surveillance camera is supported by a raised platform to form a generally downward view of the area. The camera includes at least one line scan sensor and a rotational drive system to provide rotational imaging with the line scan sensor to obtain raw image data of the surveillance area. In one implementation, a processor reduces the raw image data to motion image data that corresponds to changes between successive frames.

Line scan devices offer high resolution in building up a photographic image, but have been previously used in certain applications. They have been primarily applied to straight, linear image scans such as, for example, machine vision imaging in which images of moving objects on conveyor belts are captured, or satellite imaging in which a terrestrial image is scanned by orbital motion of the satellite. In another use, line scan devices are aligned parallel with and rotated about an axis of rotation to form a scanning panoramic still image.

In contrast, the at least one line scan sensor in a camera of the present invention is arranged to be not parallel to the axis of rotation. For example, the at least one line scan sensor may be perpendicular to, or at an acute angle to, the axis of rotation. As a result, the rotation of the line scan sensor allows high-resolution multi-frame (e.g., motion) images to be formed for a much larger image area than conventional closed circuit television cameras.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

In the discussion that follows, terms such as "persistent surveillance system" to refer to sample implementations of the present invention. However, no particular limitation should be inferred in the scope or applicability of the invention from use of this term.

Figure 1:
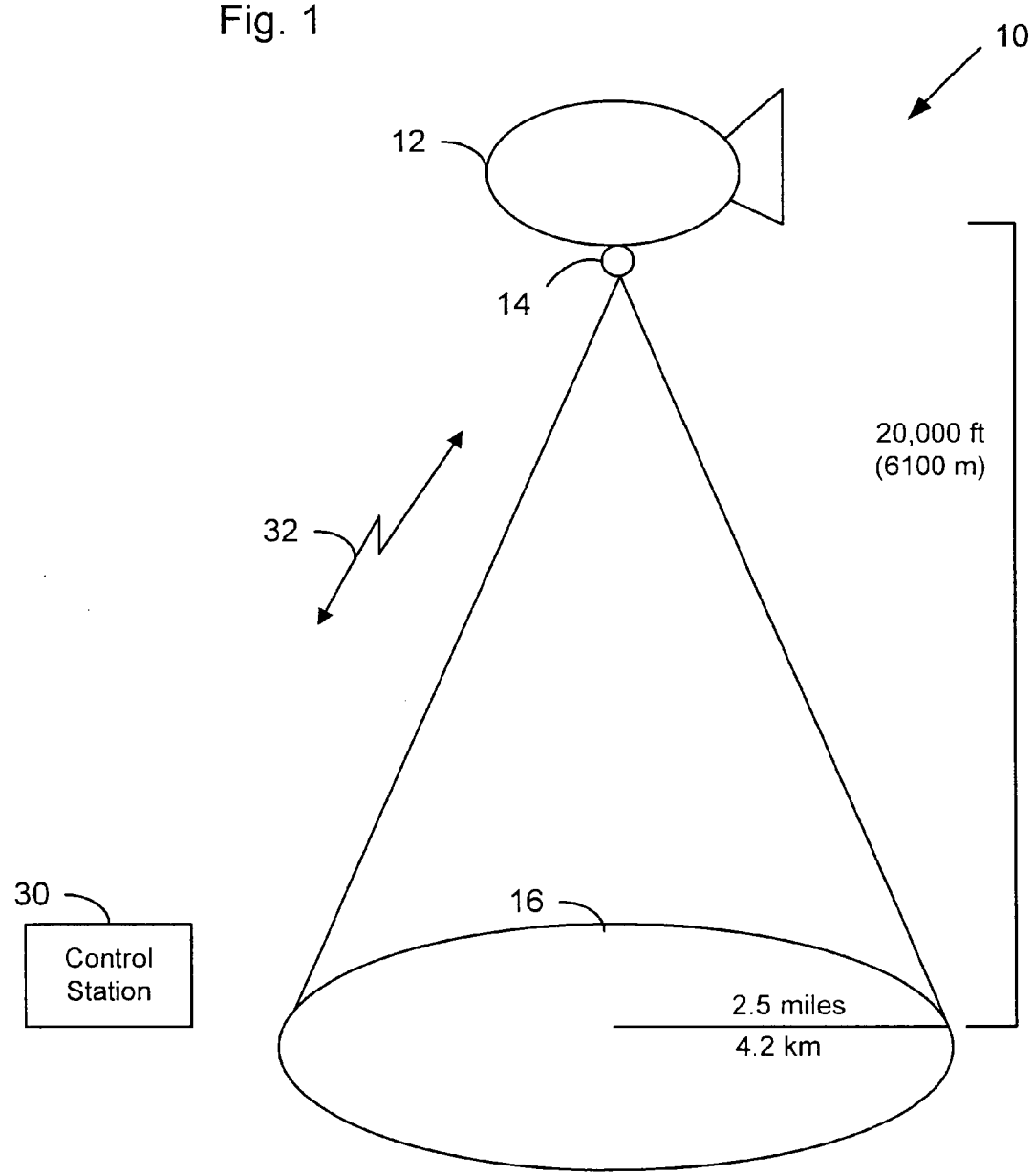
FIG. 1 illustrates a high-resolution persistent surveillance system according the present invention.

The present invention features a repeated high-resolution scanning of a wide area from a fixed position. FIG. 1 illustrates a high-resolution persistent surveillance system of a wide area 10 according the present invention. The persistent surveillance system 10 includes a persistent airborne platform such as a stabilized aerostat, blimp, dirigible or tethered balloon, referred to as a blimp 12, which supports a downward-looking high resolution surveillance camera system 14. This high resolution camera system 14 continuously images a large surveillance area 16 of multiple square miles at a resolution capable of discerning vehicles and individual human beings. In one example implementation, surveillance area 16 corresponds to a circle with a radius 18 of about 2.5 miles (13,200 feet) and encompasses an area of about 20 square miles, and the blimp 12 maintains camera system 14 at a relative elevation of about 20,000 feet.

Figure 2:
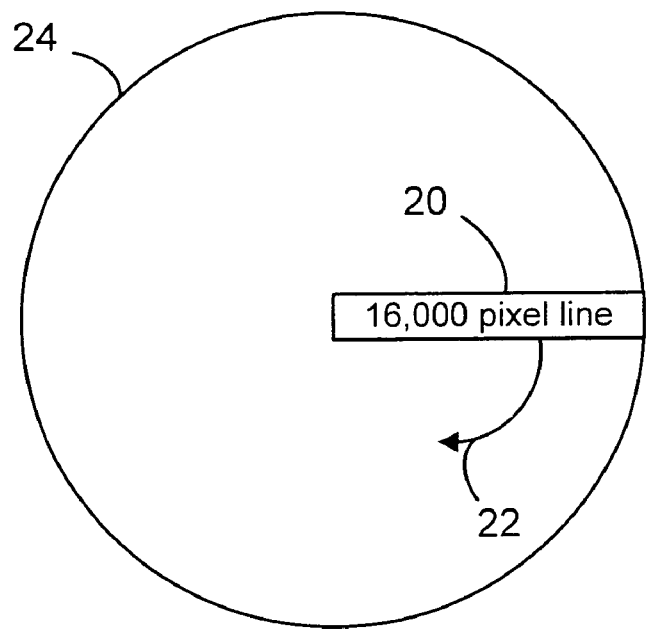
FIG. 2 is a diagrammatic illustration of rotational line scan imaging.

FIG. 2 is a diagrammatic illustration of the operation of the image scanning of camera system 14 (FIG. 1). In one implementation, camera 14 includes a line scan sensor 20 with, for example, a color resolution of 16,000 pixels. The line scan sensor 20 may be a single monolithic sensor or may be formed from plural separate line scan sensor elements. Line scan sensor 20 is swept in a circular scan 22 to form a field of view 24 of surveillance area 16 of about 803,840,000 ($\pi(16000^2)$) pixels per complete rotation. This represents a ground sample distance of 1 square foot per pixel, which represents a NIIRS (National Imagery Interpretability Rating Scale) resolution of about 6, easily enough to see cars and even the shadows of individuals. One or more line scan sensors can perform this rotation within the lens image formed by a single fixed lens, or each sensor can have its own lens, moving together as a unit, as described below in greater detail.

With reference to FIG. 1, an image signal is transmitted from camera system 14 to a control station 30 (e.g., a ground station) over a high capacity digital signal link 32. As a result, camera system 14 and control station 30 include appropriate transceivers, antennae, etc. In operation, control station 30 may also transmit camera system control signals and other system control signals to camera system 14. For example, a Data Translation Camera Link (33 MHz 32 bit) frame grabber for up to 16 K line scan sensor has a maximum transfer rate of 132 MB/sec, equal to a 16 K sensor at 8250 scans/sec. At frame rates of 10 fps, 20 fps, or 30 fps, the full raw image data of 1608 MB per frame (804 M pixels with at least 2 bytes per pixel) would be difficult to transmit.

It will be appreciated, however, that the transmission of all of the raw image data is not necessary for persistent surveillance. What is most desired in this application are images of moving elements, such as people and cars, not the static elements like trees and buildings. Therefore, in one implementation, the raw image data from each sweep (i.e., from each frame) is subtracted from the immediately preceding frame, thereby providing a movement image signal that includes only the moving or changing objects with a reference to where they are located in the image frame, while the non-moving objects are essentially reduced to zero. The movement image signal is then transmitted over link 32 to control station 30 or stored locally for later transmission.

The movement image signal would still lead to a high bandwidth overall, but if the raw image data can be reduced by a factor of 100:1, then the 1608 MB frame image becomes 16 MB. This represents a reduced number of pixels, on an essentially black background, which can then be further compressed by conventional codecs to form the final transmitted image data. Existing codecs such as the MPEG family, especially the H.264/MPEG-4 standard, already employ data reduction through detecting and encoding the moving parts of an image. The bandwidth can be further reduced, and the objects of interest can be further identified, if they are run through object-recognition and tracking software to isolate and identify them, even if they are part of a large and complex moving pattern.

Therefore, with data reduction and compression, even at a frame rate of several frames per second, the image data can be captured with a high-bandwidth data recorder such as the Dodeca 2000/2360 Telemmersion® Camera System, available from Immersive Media Company of Portland, Oreg., which is capable of recording 110 million pixels per second, compressed to a write speed of 24 MB/sec. As an alternate form of image data recorder, even a conventional DVCPRO HD video tape recorder (e.g., the AJ-1200a available from Panasonic) can be employed. Other forms of data recorders are also available. An ideal recording system would be able to record for long periods of time in a secure manner, and be easily searchable for any desired information. The target frame rate for successive for sweeps of the overall image should be at least 1 fps, but preferably 10 fps, 20 fps or 30 fps for better recording of motion.

Using the described invention with an event such as a bombing, the image recording can be traced back in time prior to the event. Given that the time and place of the crime (e.g., the bombing) is known, the perpetrators can be seen planting it, and they can be traced back to where they came from. Other traffic patterns will reveal the extent of their associates.

Figure 3:
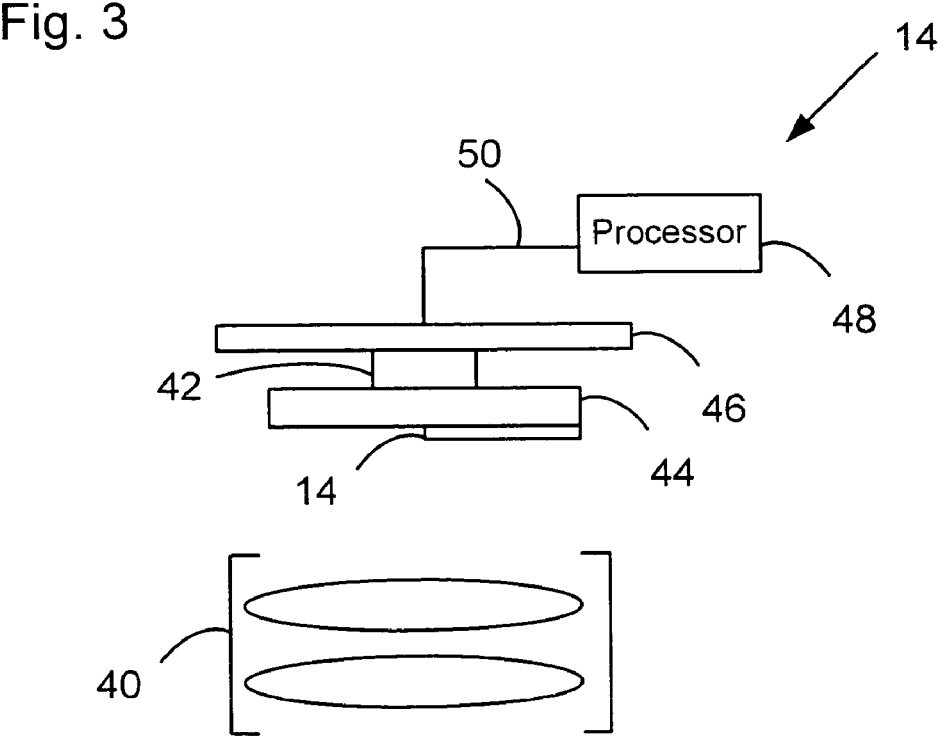
FIG. 3 is a diagrammatic block and side view of a camera system according the present invention.

FIG. 3 is a diagrammatic block and side view of a camera system 14, which includes line scan sensor 14, a high quality, aerial surveillance grade lens arrangement 40, a motor drive 42 to provide rotational sweep of line scan sensor 14 on a rotational scan wheel 44 relative to a fixed hub 46, and a localized processor 48 that is coupled to line scan sensor 14 by a high bandwidth data bus 50. Scan wheel 44 has or defines a major plane that rotates about a rotational axis and is substantially parallel to the surveillance area. Lens arrangement 40 is of a high aerial surveillance optical quality to minimize resolution losses in the lens arrangement and to be as sensitive to light as possible so that imaging can be done in different lighting conditions. Processor 48 provides onboard data analysis and reduction to obtain the motion image data.

An occasional image scan cycle can be devoted to a non-reduced, full-resolution image that can serve as an optional background or context image. Such an image can also provide a double-check against missing information and can assist in adapting the system to changing lighting and weather conditions. Accordingly, a complete raw image may be transmitted to control station 30 periodically (e.g., once every selected number of seconds or minutes). Processor 48 may optionally provide electronic image stabilization with reference to landmarks within the image, such as streetlights or other still targets, to keep the overall image as stable as possible to minimize erroneous indications of moving object artifacts. Detected offsets in position that appear as dramatic increases on the frame-to-frame motion of the objects in the frame can be sent to the navigation and stabilization system of the blimp to aid it in maintaining its position. In addition, camera system 14 may include mechanical stabilization, such as one or more gyroscopes, to increase image stability.

Figure 4:
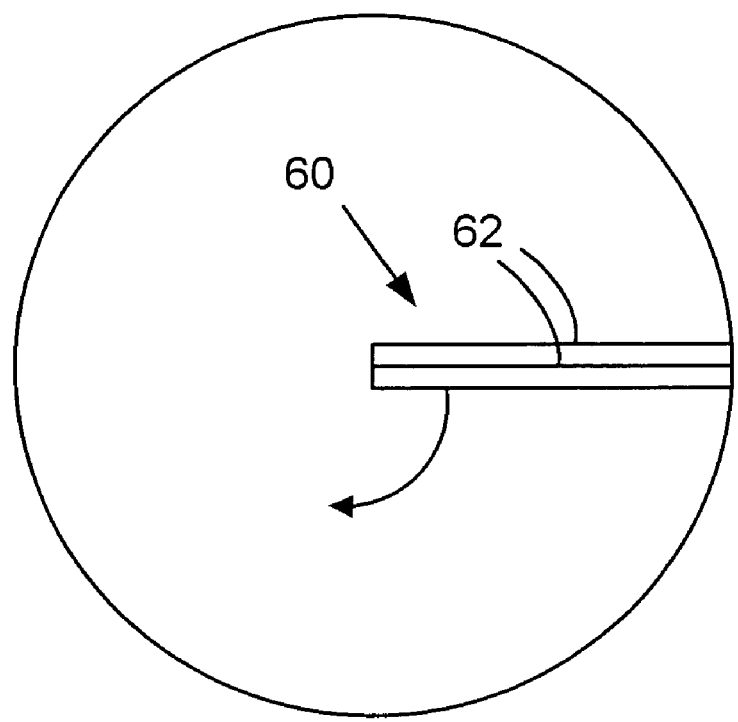
FIG. 4 is a diagrammatic illustration of an alternative line scan sensor arrangement employing plural line scan sensors.

FIG. 4 is a diagrammatic illustration of an alternative line scan sensor arrangement 60 employing plural line scan sensors 62. FIG. 4 shows only two line scan sensors 62, but more than that number could be used. In one implementation, each of the plural line scan sensors 62 may be for the same type of imaging or light (e.g., visible light) to be used cooperatively to build up resolution faster. The line scan sensor may be CCD, CMOS or any other type as required for best performance.

Line scan sensors tend to be insensitive to light because their constant motion prevents them from lingering over a given image target to increase the amount of light captured. Plural sensors 62 placed close together in parallel can act to increase the effective light-gathering capacity of the individual pixels by repeated imaging of the same spot with successive sensors 62. The results of each of the plural sensors 62 can then be summed together to obtain increased image signal resolution. Also, the scanning speed can be adjusted to the lighting conditions, with slower scans for low light conditions (e.g., at night) and faster scans in bright conditions (e.g., daytime).

In alternative implementations, the plural line scan sensors 62 may be directed to different types of imaging or light. For example, one or more line scan sensors 62 could image visible light while one or more other line scan sensors 62 could be adapted for one or more of LIDAR, infrared, etc. Also, conventional area (i.e., two-dimensional) sensors can be used to provide reference images and could be placed in the non-moving hub 46.

The essential moving objects, isolated on an essentially blank field, can be identified by color, shape and other factors, and reduced further to symbols or icons moving on the blank field. These symbols can be transmitted with low-bandwidth connections to portable devices such as cell phones or other mobile user devices.

During the scan there is a varying density of pixels, because the interior is scanned more often than the outside edge. For a scanned image disk with a radius of 16,000 pixels, a basic density might be determined at a midway point. The density therefore along a circumference line halfway out onto the radius equals 50,265 pixels around, and since each scan of the line sensor would produce one of these pixels, this equals 50,265 scans. If one is using the Camera Link interface, the maximum bandwidth of 132 MB/s means that for a 16 K imager there could be 8250 scans per sec (at 1 byte per pixel), so 6 sensors would nearly cover the whole amount in 1 second, using every pixel. To maintain the same data density, one can safely discard samples more and more as one travels toward the center, while the data will be progressively thinner unless it is augmented from another source, such as additional sensor scans or a simulation via interpolation from the existing data.

A small variation of the length of the scans, accomplished by increasing the clock rate but discarding image information before it is sent out on the camera bus, can safely preserve the essential information and increase the effective scan rate. For example, if every other scan were made to be 15,000 pixels instead of 16,000 pixels long, by beginning the scan at a point farther from the center, the missing information can be easily found from the adjacent scans in this densely scanned center area, and the overall scan rate, and the overall scan rate is increased to 8516 scans per second, which is more than enough to cover the number of pixels around the 50% circumference with six sensors.

Figure 5:
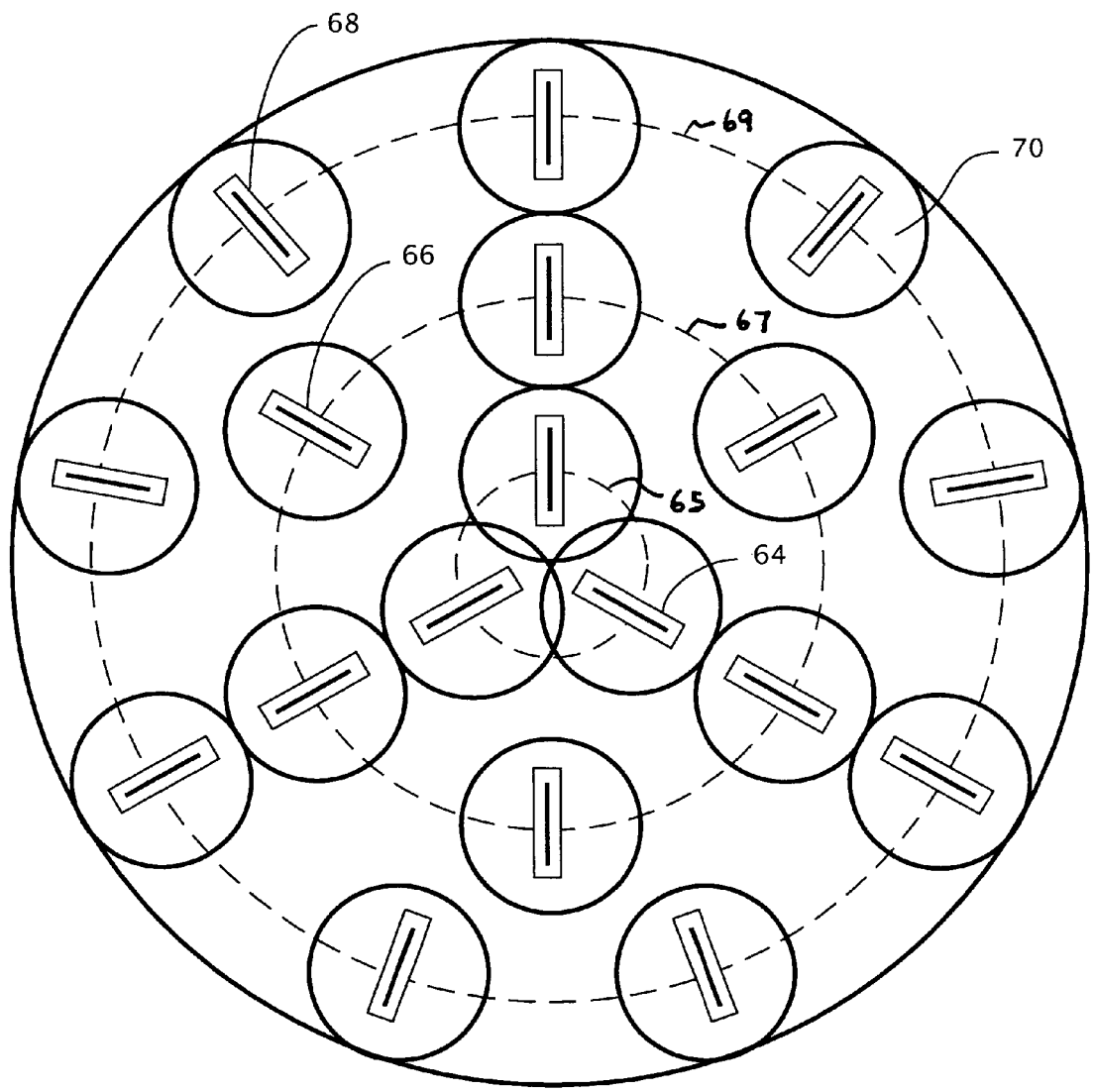
FIG. 5 is a diagrammatic illustration of multiple line scan sensors arranged in concentric rings.

To produce an optimal balance of density of the scanned image between the inner diameter and the outer diameter, multiple sensors with shorter line lengths can be employed in concentric rings. One optimal arrangement of sensors employs sensors arranged in three concentric rings, as shown in FIG. 5. An innermost ring 65 at an inner radius has three sensors such as at 64, a middle ring 67 at a middle radius has six sensors, such as at 66, and an outer ring 69 at an outer radius has nine sensors, such as at 68. The line sensors themselves are shown, together with the limits of the image, for example at 70, produced by their associated lenses. If the lenses have a wider field of view, there will be more overlap between the concentric rings. In the example above, the circumference of the image at a distance 25% out from the center is 25,132 pixels, which can be covered by three sensors each producing at least 8500 scans. For the circumference of 50,265 pixels at a distance 50% out, six sensors would be required, and for the outer ring at a diameter 75% out, nine sensors would be needed to cover the distance of 75,398 pixels. For best results, the rings should overlap, to aid the blending of the overall image, and fill in the attenuated sections of the outside of a ring with the denser portions at the inside of the next ring. So for the above example, 6 K line sensors can produce a required 16 K overall radius for the overall image, with a 1 K pixel overlap for blending between each ring, and also for helping to interpolate the center and maintain a more constant regard for that region. Other sensor rings that will also make a more even density are 1, 2 and 3 sensors, as well as 2, 3 and 5 sensors.

Figure 6:
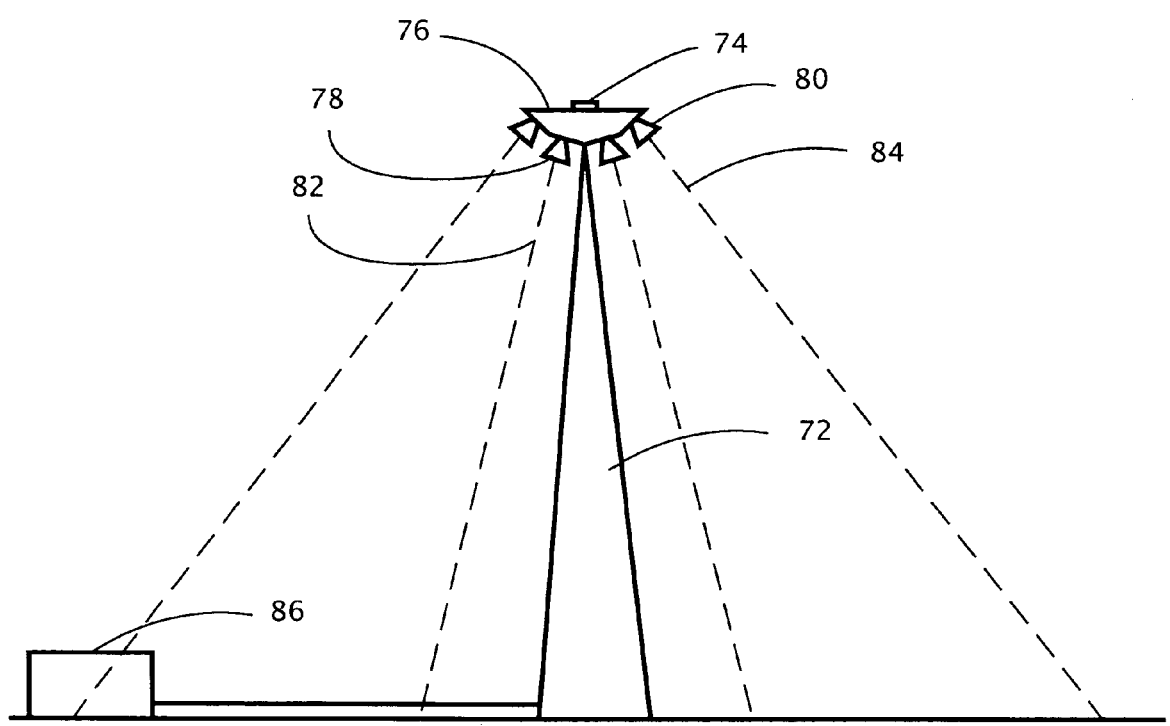
FIG. 6 is a diagrammatic side view of an alternate arrangement with a tower support.

In another embodiment, as shown in FIG. 6 the scanning camera can be affixed to the top of a tall pole or tower, and viewing all or part of a surrounding area. In this case, the pole or tower 72 represents the fixed point of support for the camera, and the pattern of the scanning is adjusted to how wide an area is of interest. A rotational drive system 74 rotates the rotational scan wheel 76 so that the line scan sensors 78 and 80, together with their associated lenses and respective optical axes 82 and 84, scan the surrounding area repeatedly. The transmission of the image and control signals to a remote control station 86 in this case can be through wires instead of a wireless link. In imaging from a tower at a lower altitude the optical axes 82 and 84 are likely to diverge from the central axis of rotation to form a wide or narrow overall cone. This contrasts with implementations in which the camera system is at a high altitude, where the optical axis of each line scan sensor may be more substantially parallel to the axis of rotation.

Figure 7:
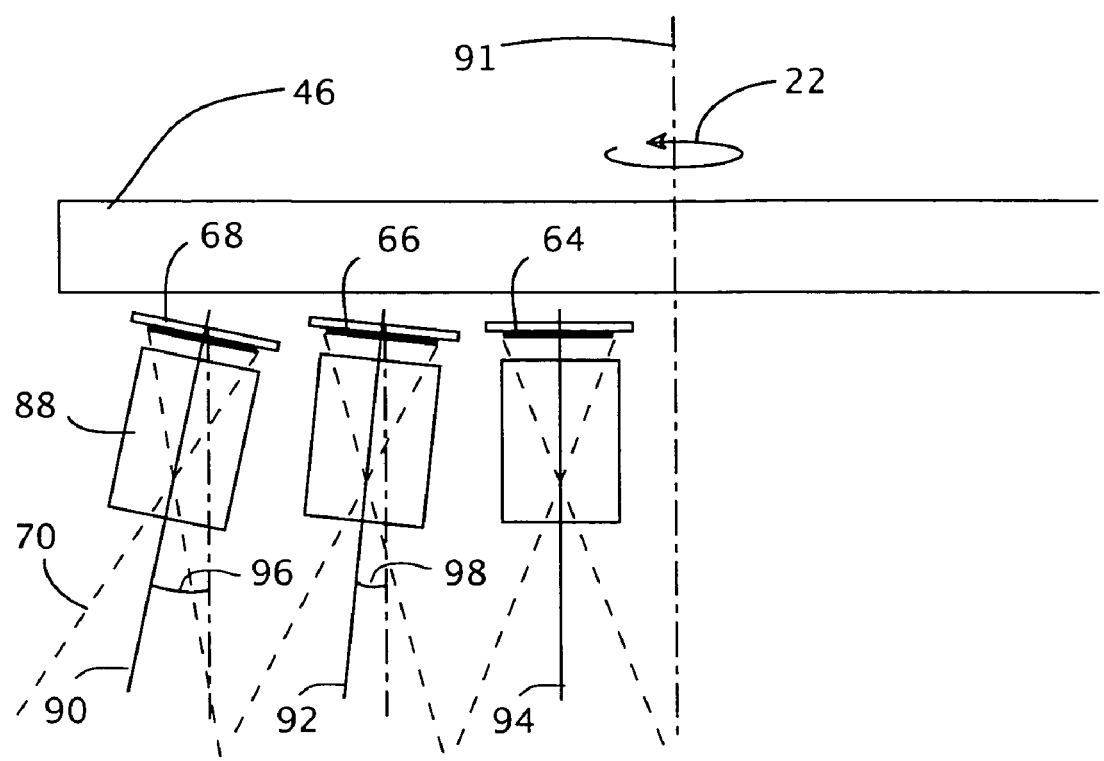
FIG. 7 is a diagrammatic side view of multiple line scan sensors and their associated lenses and optical axes.

FIG. 7 is a cross section view of sensors at different of FIG. 5. Three line scan sensors are shown at 64, 66, and 68, to illustrate the sensors in the concentric rings 65, 67, and 69, respectively. Sensors 64, 66, and 68 have associated lens arrangements 88 with respective optical axes 94, 92, and 90. All of these elements are coupled to a rotational scan wheel 46, which is rotated 22 about a rotational axis 91. To get wider overall coverage, some of the line scan sensors may be turned outward from the axis of rotation As shown in the illustrated example, optical axes 90 and 92 form slight angles 96 and 98, respectively, relative to the central axis of rotation 91.

Various components are already available to aid in the construction of such a system. For better sensitivity to light in the line scan sensor, Time Delay Integration (TDI) scanners can be used. An example is the Fairchild Osprey CAM/CCD-4KLV.TDI high performance camera sensor. Schneider Optical's 12 K 5.6/120 Line Scan lenses can support resolutions of up to a 12 K line scan. Sony's ILX585K line scan sensor has a resolution of up to 64 K pixels. For data processing and transmission, Bitware's T2-PM Digital Signal Processing board has ADSP-TS201 Tiger Sharc processors with up to 6 GB/sec throughput, which is the equivalent of 7.5 800 MB scans per second. Video Perception, Inc. has special-purpose chips for motion detection and image extraction.

Discarding non-moving objects data reduces the overall data flow to manageable levels. For a further reduction, the identified moving objects can be represented as symbols, rather than as collections of pixels, thereby simplifying storage and transmission of essential information. Multiplying the scanning sensors and applying parallel data paths enables a faster repeating frame speed, which has a better change of catching an accurate picture of moving objects.

OPERATIONS, RAMIFICATIONS AND SCOPE

It will be appreciated by one skilled in the art that the present invention can also be presented in other embodiments. It will be evident to artisans that features and details given above are exemplary only. Except where expressly indicated, it should be understood that none of the given details is essential; each is generally susceptible to variation, or omission.

The invention claimed is:
1. A surveillance system, comprising:
a persistent elevated platform; and
a camera system supported by the persistent elevated platform to repeatedly image a fixed surveillance area, the camera system having a rotational drive system that includes a rotational scan wheel having a major plane that is rotatable about a rotational axis and is substantially parallel to the fixed surveillance area, at least one optical sensor that is coupled to the rotational scan wheel, and a lens arrangement to pass light to said at least one optical sensor, the lens arrangement having an optical axis that is not perpendicular to the rotational axis, and a processor that stores raw image data of the fixed surveillance area created by the at least one optical sensor so as to build up a frame of the fixed surveillance area with each successive complete rotation of the at least one optical sensor about the rotational axis.
2. The system of claim 1 in which the optical axis is at an acute angle to the rotational axis.

3. The system of claim 1 in which the optical axis is parallel to the rotational axis.

4. The system of claim 1 further comprising a real-time data link between the camera system supported by the persistent elevated platform and a remote control station where the raw image data are recorded at a frame rate of at least one frame per second.

5. The system of claim 1 wherein the processor further reduces the raw image data to motion image data corresponding to changes between successive frames, and the motion image data are recorded at a frame rate of at least one frame per second.

6. The system of claim 5 wherein the motion image data are transmitted to a remote control station.

7. The system of claim 6 wherein full resolution frames are transmitted in addition to motion image data.

8. The system of claim 1 in which the persistent elevated platform is airborne.

9. The system of claim 8 in which the persistent elevated platform includes a blimp.

10. The system of claim 1 in which the persistent elevated platform is fixed aground within the fixed surveillance area.

11. A surveillance system, comprising:
a platform persistently elevated at a substantially fixed position above a fixed surveillance area; and
a camera system supported by the platform to persistently image the fixed surveillance area, the camera system having at least one optical sensor and a lens with an optical axis, and a rotational drive system to rotate the at least one optical sensor about a rotational axis to obtain raw image data of the fixed surveillance area so as to build up a frame of the fixed surveillance area with each successive complete rotation of the at least one optical sensor about the rotational axis, wherein the optical axis is not perpendicular to the axis of rotation.

12. The system of claim 11 further comprising a processor that reduces the raw image data to motion image data corresponding to changes between successive frames.

13. The system of claim 11 in which the optical axis is at an acute angle to the rotational axis.

14. The system of claim 11 in which the optical axis is parallel to the rotational axis.

15. The system of claim 11 further comprising a real-time data link between the camera system and a remote control station where the motion image data are recorded at a frame rate of at least one frame per second.

16. The system of claim 11 in which platform is airborne.

17. The system of claim 16 in which the platform includes a blimp.

18. The system of claim 11 in which the platform is fixed aground.

19. A surveillance system, comprising:
a platform persistently elevated at a fixed position above a fixed surveillance area; and
a camera system supported by the persistent elevated platform to persistently image the fixed surveillance area, the camera system having at least one optical sensor, a rotational drive system to rotate the at least one optical sensor about a rotational axis to obtain image data of the fixed surveillance area so as to build up a frame of the fixed surveillance area with each successive complete rotation of the at least one optical sensor about the rotational axis, and a processor that reduces the raw image data to motion image data corresponding to changes between successive frames.

20. The system of claim 19 further comprising a real-time wireless data link between the camera system and a remote control station where the motion image data are recorded at a frame rate of at least one frame per second.

21. The system of claim 19 in which the fixed surveillance area is of more than one square mile and the camera system has a resolution on the order of one square foot or less at a frame rate of at least one frame per second.

22. The system of claim 19, wherein the rotational axis is orthogonal to the fixed surveillance area.

* * * * *